US012591546B2

(12) United States Patent
Fox et al.

(10) Patent No.: US 12,591,546 B2
(45) Date of Patent: Mar. 31, 2026

(54) MODIFIED CONFLICT-FREE REPLICA DATA TYPE (CRDT) OPERATION TRANSMISSION WITH CONFLICT AVOIDANCE

(71) Applicant: Microsoft Technology Licensing, LLC, Redmond, WA (US)

(72) Inventors: Seth Fox, Seattle, WA (US); Vijay Kumar, Delhi (IN); Zachary Allen Griswold, Covington, WA (US); Ali Taleghani, Redmond, WA (US); Caroline Grace Brown, Seattle, WA (US); Neeraj Bisht, Faridabad (IN); Anup Nagrath, Noida (IN); Rishav Gautam, Ghaziabad (IN); Lalit Vohra, Delhi (IN)

(73) Assignee: Microsoft Technology Licensing, LLC., Redmond, WA (US)

( * ) Notice: Subject to any disclaimer, the term of this patent is extended or adjusted under 35 U.S.C. 154(b) by 5 days.

(21) Appl. No.: 18/668,091

(22) Filed: May 17, 2024

(65) Prior Publication Data

US 2025/0355838 A1 Nov. 20, 2025

(51) Int. Cl.
  *G06F 16/176* (2019.01)
  *G06F 16/178* (2019.01)

(52) U.S. Cl.
  CPC ........ *G06F 16/1774* (2019.01); *G06F 16/178* (2019.01)

(58) Field of Classification Search
  CPC .............. G06F 16/176; G06F 16/1774; G06F 16/2365; G06F 16/27; G06F 16/273; G06F 16/30; G06F 16/9024

(Continued)

(56) References Cited

U.S. PATENT DOCUMENTS 6,983,293 B2 * 1/2006 Wang ...................... G06F 16/27
11,630,838 B1 * 4/2023 Gujral ................ G06F 16/9024
  707/625

(Continued)

FOREIGN PATENT DOCUMENTS

CN   113010549 A   6/2021
WO   WO2007106239   * 9/2007 ............. G06F 16/27

OTHER PUBLICATIONS

"Azure Fluid Relay" accessed on link https://azure.microsoft.com/en-in/products/fluid-relay/, 2024, 7 pages.

(Continued)

*Primary Examiner* — Shahid A Alam
(74) *Attorney, Agent, or Firm* — Foley IP Law, PLLC

(57) ABSTRACT

Improved solutions for merge conflict avoidance using operation-based Conflict-free Replicable Data Type (CRDT) are disclosed, for example, in a CRDT network system with two or more clients. A first operation is received to a first replica of data from a first client device. A second operation is received to a second replica of the data from a second client device. A server receiving the first operation and the second operation identifies a Unique-ID associated with the first operation and the second operation. The server determines whether a collision is detected based on the Unique-ID identified. In response to detecting a collision based on the Unique-ID, the second operation received from the second client device is rejected and sent back to the second client, and a third operation to the second replica of the data is received from the second client device, the third operation including an updated Unique-ID.

18 Claims, 6 Drawing Sheets

(58) Field of Classification Search
USPC ........................................ 707/608, 625, 201
See application file for complete search history.

(56) References Cited

U.S. PATENT DOCUMENTS

| | | | |
|---|---|---|---|
| 2004/0122870 A1* | 6/2004 | Park | G06F 16/27 |
| 2005/0177617 A1* | 8/2005 | Banginwar | H04L 69/329 |
| | | | 709/203 |
| 2007/0185920 A1* | 8/2007 | Castro | G06F 16/273 |
| 2007/0198599 A1* | 8/2007 | Tobies | G06F 16/27 |
| 2014/0164890 A1* | 6/2014 | Fox | G06F 40/166 |
| | | | 715/202 |
| 2015/0169502 A1* | 6/2015 | Koenig | G06F 3/04842 |
| | | | 715/256 |
| 2017/0024451 A1 | 1/2017 | Sullivan | |
| 2019/0340166 A1 | 11/2019 | Raman | |
| 2019/0340168 A1* | 11/2019 | Raman | G06F 11/2007 |
| 2020/0059376 A1 | 2/2020 | Slovetskiy | |
| 2020/0412795 A1 | 12/2020 | Lucco | |
| 2022/0327160 A1 | 10/2022 | Solomon | |

OTHER PUBLICATIONS

"Conflict-free replicated data type", accessed on link https://en.wikipedia.org/wiki/Conflict-free_replicated_data_type, Feb. 29, 2024, 9 pages.

"Fluid Framework", accessed on link https://en.wikipedia.org/wiki/Fluid_Framework, Feb. 5, 2022, 2 pages.

Extended European search report received in European Application No. 25175374.5, mailed on Nov. 10, 2025, 9 pages.

* cited by examiner

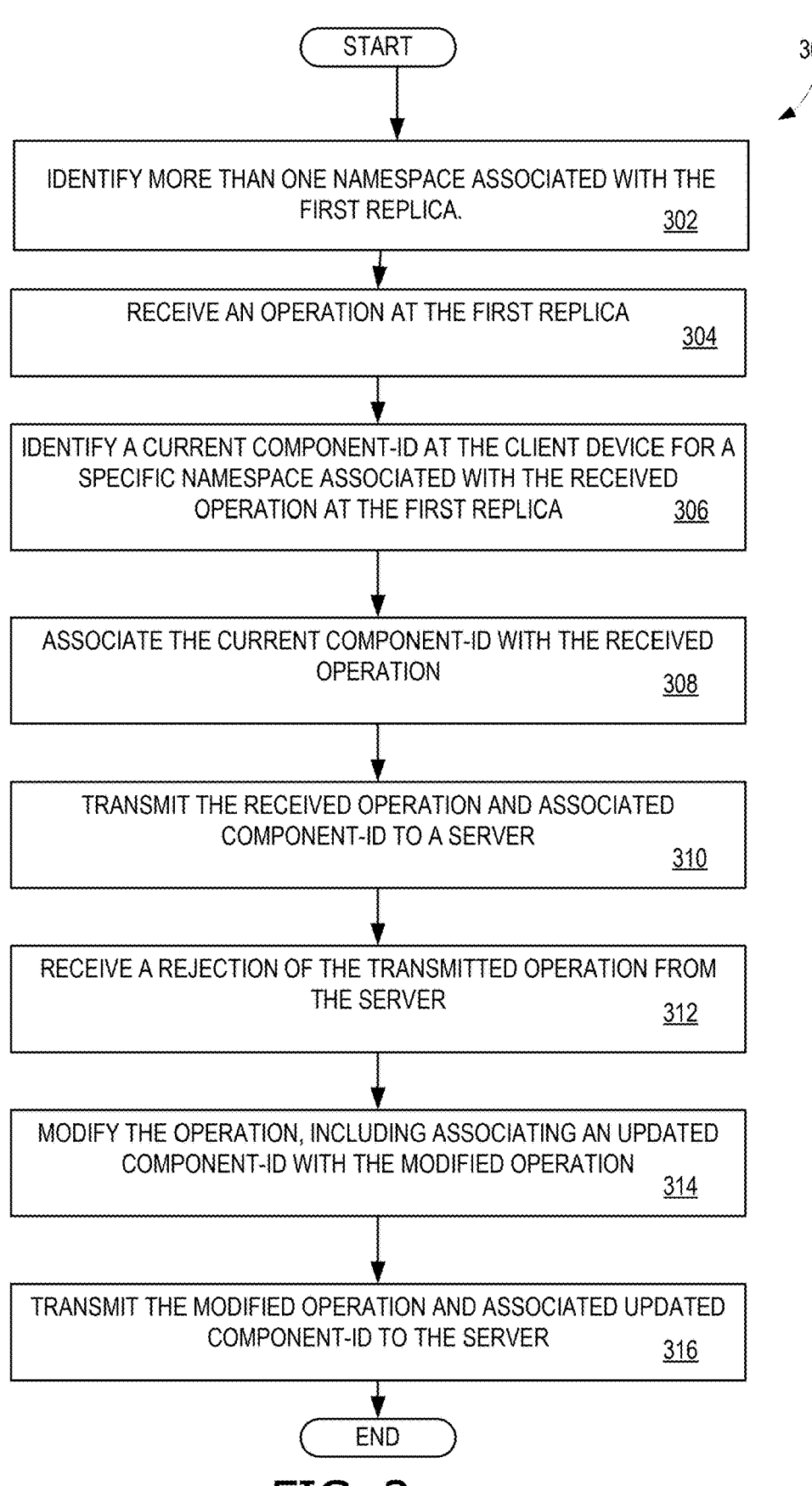

START

300

IDENTIFY MORE THAN ONE NAMESPACE ASSOCIATED WITH THE FIRST REPLICA.    302

RECEIVE AN OPERATION AT THE FIRST REPLICA    304

IDENTIFY A CURRENT COMPONENT-ID AT THE CLIENT DEVICE FOR A SPECIFIC NAMESPACE ASSOCIATED WITH THE RECEIVED OPERATION AT THE FIRST REPLICA    306

ASSOCIATE THE CURRENT COMPONENT-ID WITH THE RECEIVED OPERATION    308

TRANSMIT THE RECEIVED OPERATION AND ASSOCIATED COMPONENT-ID TO A SERVER    310

RECEIVE A REJECTION OF THE TRANSMITTED OPERATION FROM THE SERVER    312

MODIFY THE OPERATION, INCLUDING ASSOCIATING AN UPDATED COMPONENT-ID WITH THE MODIFIED OPERATION    314

TRANSMIT THE MODIFIED OPERATION AND ASSOCIATED UPDATED COMPONENT-ID TO THE SERVER    316

END

FIG. 3

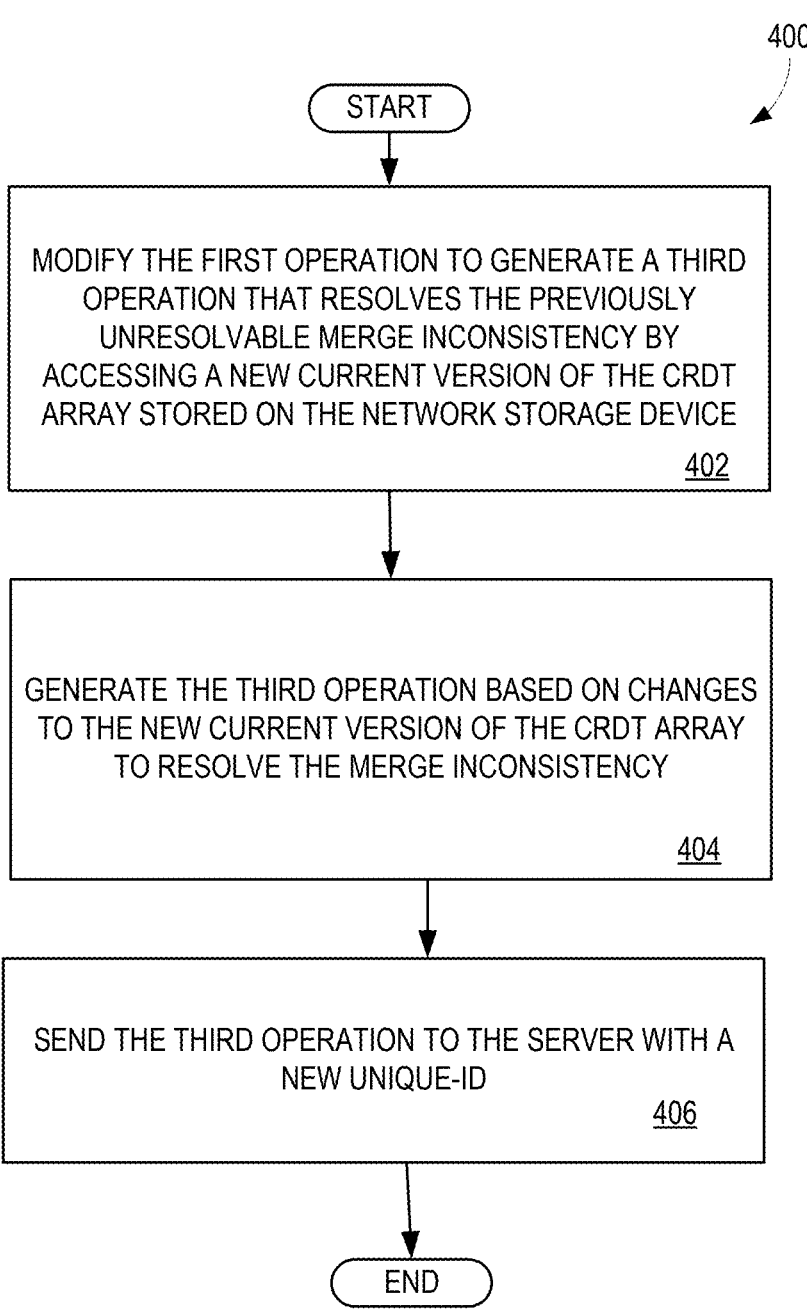

400

START

MODIFY THE FIRST OPERATION TO GENERATE A THIRD OPERATION THAT RESOLVES THE PREVIOUSLY UNRESOLVABLE MERGE INCONSISTENCY BY ACCESSING A NEW CURRENT VERSION OF THE CRDT ARRAY STORED ON THE NETWORK STORAGE DEVICE

402

GENERATE THE THIRD OPERATION BASED ON CHANGES TO THE NEW CURRENT VERSION OF THE CRDT ARRAY TO RESOLVE THE MERGE INCONSISTENCY

404

SEND THE THIRD OPERATION TO THE SERVER WITH A NEW UNIQUE-ID

406

END

FIG. 4

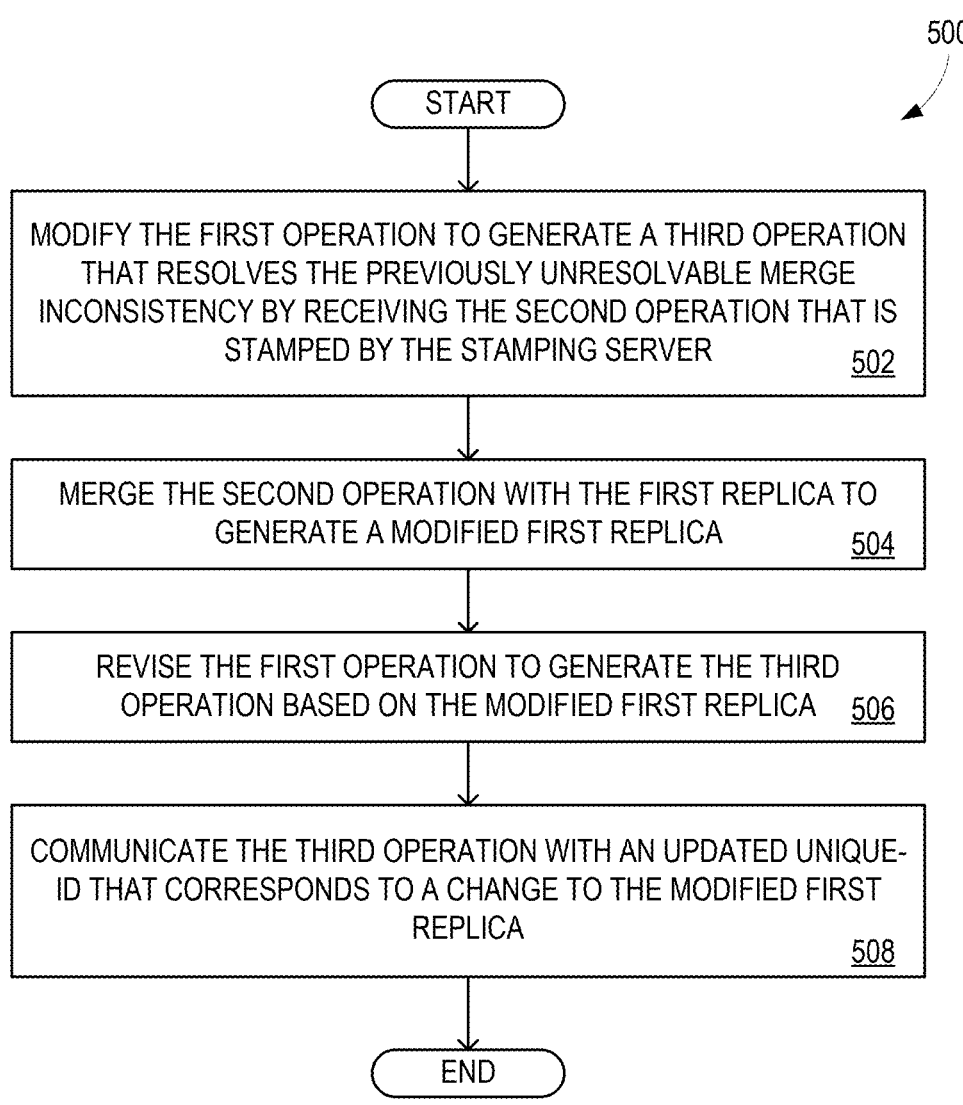

500

START

MODIFY THE FIRST OPERATION TO GENERATE A THIRD OPERATION THAT RESOLVES THE PREVIOUSLY UNRESOLVABLE MERGE INCONSISTENCY BY RECEIVING THE SECOND OPERATION THAT IS STAMPED BY THE STAMPING SERVER          502

MERGE THE SECOND OPERATION WITH THE FIRST REPLICA TO GENERATE A MODIFIED FIRST REPLICA          504

REVISE THE FIRST OPERATION TO GENERATE THE THIRD OPERATION BASED ON THE MODIFIED FIRST REPLICA          506

COMMUNICATE THE THIRD OPERATION WITH AN UPDATED UNIQUE-ID THAT CORRESPONDS TO A CHANGE TO THE MODIFIED FIRST REPLICA          508

END

FIG. 5

MODIFIED CONFLICT-FREE REPLICA DATA TYPE (CRDT) OPERATION TRANSMISSION WITH CONFLICT AVOIDANCE

BACKGROUND

In Conflict-free Replicated Data Types (CRDT) systems, many replicas of the same object or document may exist. As used herein, a replica refers to the same object or document distributed across multiple computers or devices in a network. For example, replicas may be used in distributed data centers, in computing devices such as smartphones or laptops, and other distributed computing environments. As one particular example, replicas may be used in browsers while two users are working on the same document. Thus, each user may be working on a local replica of the same document at their client device. When an object is modified in a local replica, an update is sent to the other replicas. After a replica receives the update, the replica applies the update locally. The replicas may then synchronize asynchronously. CRDTs allow multiple users to concurrently update shared objects, while ensuring eventual convergence into some consistent state.

The CRDT approach has an inherent assumption that an application or data structure replicated across multiple computers can update any replica independently, without a master-server, and concurrently, without having to coordinate with the other replicas in the distributed environment. The data types would eventually be able to resolve any inconsistency automatically that may arise due to the merging of the individual modification of these data types by the network computers or clients. This assumption led to the final guarantee for the eventual convergence for every replica in the CRDT environment, even if they have different states at a particular point in time.

SUMMARY

The disclosed examples are described in detail below with reference to the accompanying drawing figures listed below. The following summary is provided to illustrate some examples disclosed herein.

Improved solutions for merge conflict avoidance using operation-based Conflict-free Replicable Data Type (CRDT) are disclosed. Examples include receiving, from a first client device of a distributed computing environment, a first operation to a first replica of data and receiving, from a second client of the distributed computing environment, a second operation to a second replica of the data. In response to receiving the first operation and the second operation, a Unique-ID associated with the first operation and the second operation are identified. A determination is made as to whether a collision is detected based on the Unique-ID identified. In response to a determination that a collision is detected, the second operation received from the second client device is rejected and a third operation to the second replica of the data is received from the second client device.

BRIEF DESCRIPTION OF THE DRAWINGS

The disclosed examples are described in detail below with reference to the accompanying drawing figures listed below:

FIG. 3 illustrates an example flowchart of exemplary operations for operation-based CRDT that may be performed when using example architectures, such as the architecture of FIG. 1;

FIG. 4 illustrates an example flowchart of exemplary operations for operation-based CRDT that may be performed when using example architectures, such as the architecture of FIG. 1;

FIG. 5 illustrates an example flowchart of exemplary operations for operation-based CRDT that may be performed when using example architectures, such as the architecture of FIG. 1;

Corresponding reference characters indicate corresponding parts throughout the drawings.

DETAILED DESCRIPTION

Figure 1:
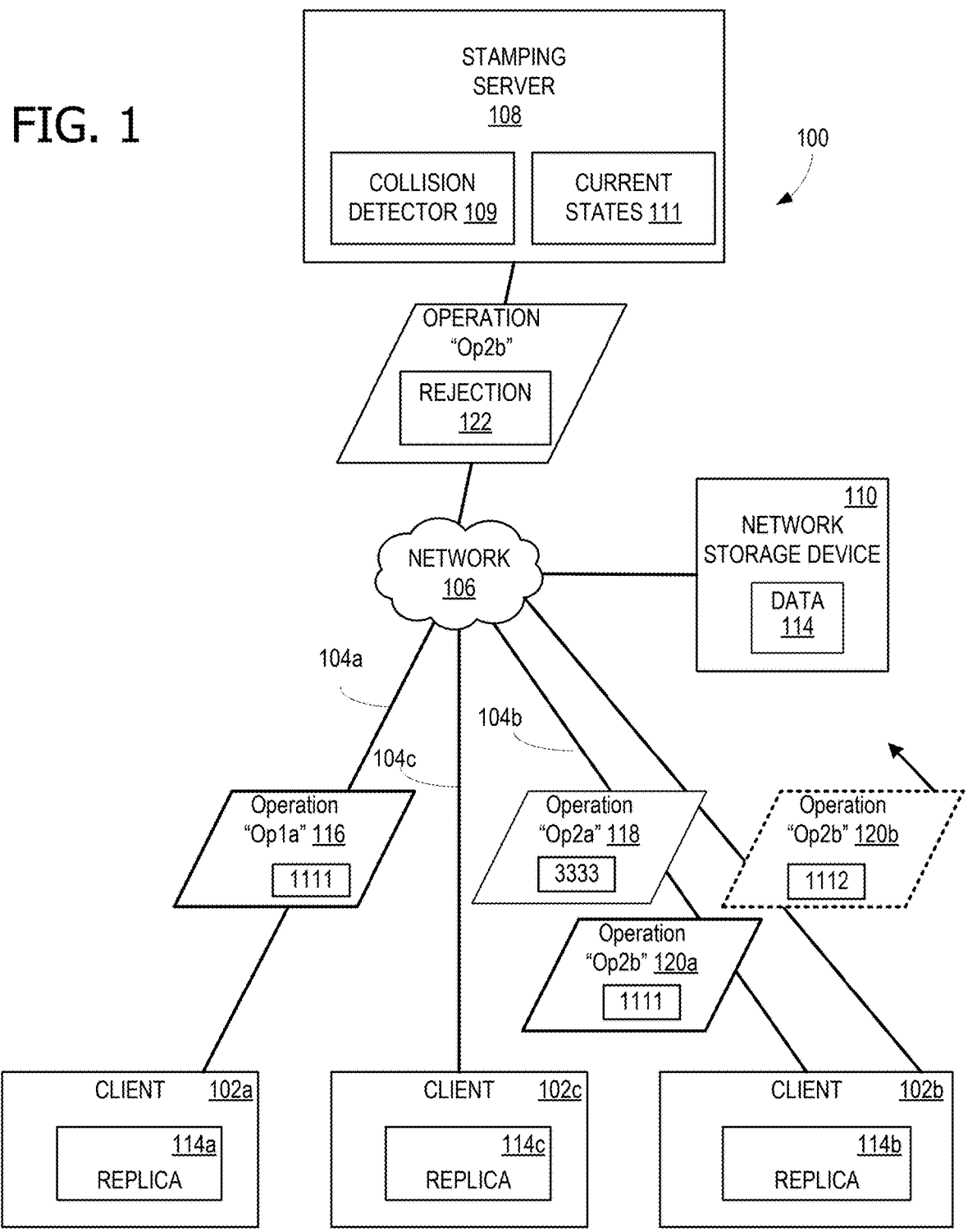
FIG. 1 illustrates an example architecture of a Conflict-free Replicable Data Type (CRDT) environment with conflict avoidance.

Aspects of the present disclosure provide a technical solution to the technical problems that are necessarily rooted in computer technology and further the art of collaborative distributive computing. Conflict-free Replicated Data Types (CRDT) is a distributed data structure (DDS) that can be replicated across multiple computers in a network. The CRDT replicas can be updated independently and in parallel, without the need for coordination between replicas, and with a guarantee that no conflicts will occur. CRDT is often used in collaborative software, such as scenarios where multiple users need to work together to edit/read a shared document, database, or state. CRDT may also be used in database software, text editing software, chat software, and the like.

In one example, an operation ("Op") based CRDT approach operates with an assumption that a system will be able to automatically resolve any inconsistency arising due to op merging, but this guarantee is not fulfilled in some systems. The present disclosure provides a guarantee of consistency by anticipating and addressing the inconsistency root cause before op merging occurs. The present disclosure provides lightweight metadata with information that is used by a server to identify the probable operation that can result in inconsistency after merging. The merging scenarios are mapped into unique identifiers ("IDs") under different namespace contexts. The metadata information can be understood by the server, for example by a stamping service of the server, and the stamping service can reject the operation for stamping if the stamping service anticipates a conflict upon merging. The rejected operation goes back to the originating client, that is the client that sent the rejected operation and which now has the understanding of the current state for that document or file based on the rejection received from the server, and the client can avoid the conflict by modifying the operation in the updated, or current, state. The rejection received from the server includes information about the current state of the CRDT DDS to provide the client with the current state for modifying the data with the intended operation.

In one example, the present disclosure implements the ops based CRDT approach via Fluid Framework. The Fluid Framework provides developers with distributed data structures (DDSs) that automatically ensure that each connected client has access to the same state. The application programming interfaces (APIs) provided by DDSs are designed to be familiar to programmers who have used common data structures before. A distributed data structure behaves like a local data structure. Client code can add data, remove data, update existing data, and so forth; however, a DDS is not a local object. A DDS can also be changed by other clients that expose the same parent container of the DDS. Because users can simultaneously change the same DDS, different DDS may be selected for modeling data for a particular implementation. Two or more clients are said to make a change simultaneously if the two or more clients each make a change before the two or more clients have received the others' changes from the server. DDSs vary from each other by three characteristics: (i) basic data structure (e.g., key-value pair, a sequence, or a queue); (ii) client autonomy versus consensus (i.e., an optimistic DDS enables any client to unilaterally change a value and the new value is relayed to all other clients, while a consensus-based DDS will only allow a change if it is accepted by other clients via a consensus process); and (iii) merge policy (i.e., the policy that determines how conflicting changes from clients are resolved).

Optimistic DDSs apply Fluid operations locally before the operations are sequenced by the Fluid service. The local changes are said to be applied optimistically in that they are applied before receiving confirmation from the Fluid service, hence the name optimistic DDSs. The benefit to this approach is the user-perceived performance; operations made by the user are reflected immediately. The potential down-side to this approach is consistency; if another collaborator makes a concurrent edit that conflicts with the DDS's, the merge resolution might end up changing the user's action after the fact. The DDSs will apply remote operations as they are made, and will always arrive at a consistent state. Many of the most commonly used DDSs are optimistic, including SharedMap, SharedString, and Fluid Framework 2.0 and later SharedTree.

As a first category of DDS, key-value data are DDSs used for storing key-value data and are optimistic and use a last-writer-wins merge policy. Although the value of a pair can be a complex object, the value of any given pair can only be changed whole-for-whole. SharedMap is a basic key-value data structure. Map nodes in a SharedTree is a hierarchical data structure with three kinds of complex nodes: (i) maps (similar to SharedMap); (ii) arrays; and (iii) JavaScript objects. There are also several kinds of leaf nodes, including Boolean, string, number, null, and Fluid handles. Key-value data structures are the most common choice for many scenarios: (i) User preference data; (ii) current state of a survey; and (iii) the configuration of a view. Common issues and best practices for key-value DDSs include storing arrays, lists, or logs in a single key-value entry, which may lead to unexpected behavior because users cannot collaboratively modify parts of one entry, which may indicate a need to try storing the data in an array node of a SharedTree. Another issue and/or best practice for key-value DDSs includes storing a large volume of data in one key-value entry, which may cause performance or merge issues. Each update will update the entire value rather than merging two updates, prompting the need to try splitting the data across multiple keys.

As a second category of DDS, sequence scenarios include: (i) tabular data; (ii) timelines; and (iii) lists. Common issues and best practices for sequence DDSs include storing only immutable data as an item in a sequence. The only way to change the value of an item is to first remove the item from the sequence and then insert a new value at the position where the old value was prior to its removal. However, because other clients can insert and remove, there is no reliable way of getting the new value into the desired position.

As a third category of DDS, hierarchical data structures are optimistic and use a last-writer-wins merge policy. For example, SharedTree is a tree of data with three kinds of complex nodes maps, similar to SharedMap, arrays, and JavaScript objects. There are also several kinds of leaf nodes, including Boolean, string, number, null, and Fluid handles.

As a fourth category of DDS, strings such as the SharedString DDS is used for unstructured text data that can be collaboratively edited and is optimistic. SharedString is a data structure for handling collaborative text. An example of a string scenarios includes a text editor.

As a fifth category, specialized data structures include SharedCounter, which is a counter that is useful to keep track of increments/decrements of integer values. While a key-value data structure appears like a good fit, two clients simultaneously setting the same key can cause issues. By contrast, clients can increase or decrease the SharedCounter value by a specified amount, but the clients cannot set the SharedCounter value to a specified value. SharedCounter is also optimistic.

Consensus-based DDSs are different from optimistic DDSs in that they wait for confirmation from the Fluid service before applying operations, even local operations. These data structures offer additional behavior guarantees and can be used when atomicity or synchronous behavior is needed. These behavioral guarantees cannot be implemented in an optimistic way. The cost is performance; optimistic DDSs are part of what makes the Fluid Framework fast, so using optimistic DDSs is almost always preferred. Consensus data structures have one or both of these characteristics: (i) only one client can perform a particular action on a particular data item, such as pull an item off of a queue; and (ii) an action, such as changing a value, can occur only when all clients consent to it. Consensus-based DDSs are thus not optimistic. Before a change to a consensus data structure is confirmed, the connected clients must acknowledge the change. An example of a consensus-based DDS is TaskManager that tracks queues of clients that want to exclusively run a task. Typical scenarios require the connected clients to "agree" on some course of action, such as importing data from an external source. Multiple clients concurrently importing data may lead to duplicate data. Another example is upgrading a data schema that requires all clients to agree to simultaneously make the change.

The CRDT approach works well for many systems, such as collaborative platforms or collaborative applications for example, based on the assumption of automatic inconsistency resolution. However, the technical problem arises when the data types are unable to resolve the inconsistency. Although the probability of inconsistencies in the CRDT environment is low, when inconsistencies do occur, it is disruptive and costly. Existing applications using CRDT use a few techniques such as a special handling of the corner case scenarios. In this example, one leader client fixes the inconsistent state, and other clients wait, shut down, and restart, then receive the update from the leader client to apply locally. Corner case scenarios allow the data type to merge and then detect the inconsistency after merging before taking corrective action. This approach is still disruptive, especially as multiple clients have to wait and restart to resolve the inconsistencies.

The present disclosure provides a modified CRDT approach that avoids low probability conflicts by sending unique identifiers (IDs) in multiple namespaces to detect potential inconsistencies before merging the operations. A namespace is a context within which the names of all objects must be unambiguously resolvable. It is used to declare a scope that contains a set of related objects, and to organize code elements and create globally unique types. Namespaces provide a mechanism for hiding local identifiers and grouping logically related identifiers into corresponding namespaces, thereby making the system more modular.

The modified CRDT approach of the present disclosure provides a technical solution to the technical problem of inconsistencies in the CRDT environment by utilizing unique IDs to detect the potential inconsistencies before merging operations and rejecting the proposed operation associated with the detected potential inconsistency in order to prompt a client that sent the rejected operation to update and resend the proposed operation to avoid the inconsistency without disruption to the distributed system. This technical solution improves the underlying CRDT computing environment by fulfilling the promise of eventual consistency without disruption, while also improving computer resource usage by mitigating the need for system delay or system restart in order to update and achieve consistency in a distributed computing environment. In addition, this technical solution improves the human computer interaction by fulfilling the consistency expectation of the CRDT environment without disruption.

A CRDT server is generally a lightweight server that numbers (or stamps) the incoming operations from clients in a particular order, but has no information about the data purpose associated with the incoming operations. The lightweight server, or stamping server, reads incoming operation numbers and, if a client-generated operation number currently stored at the lightweight server is from an older client state, updates the stored operation number to a new unique number that is passed to other clients in the distributed network environment. Conventional CRDT servers do not do any further processing for the operations. For example, an operation from client-1 ("Op1a") received by the stamping server is numbered by the stamping server and a next operation received from client-2 ("Op2b") is also numbered, with the stamping server sending both to the other clients in the network. The conventional stamping server is not aware that the "Op1a" and "Op2b" may conflict because the server is a general relay and stamping server. When these operations reach all of the connected clients in the network, if a conflict exists, it causes inconsistencies or conflicts on each client in the network. This breaks the CRDT promise of eventual consistency.

According to aspects of the present disclosure, a unique identifier ("Unique-ID") is associated with each operation sent by the clients in a distributed system. The Unique-ID may be information included in metadata associated with the operation, for example. The CRDT server receives the operation, including the metadata containing the Unique-ID, identifies the Unique-ID associated with the incoming operations from various clients, and determines whether the Unique-ID of the received operation collides with a previously or concurrently received operation's Unique-ID. An operation is rejected without passing the operation to the other clients if the Unique-ID is identical (i.e., conflicts or collides) with a previously or concurrently received operation from another client. When the CRDT server does not detect a collision, the operation is distributed to other clients, and the other clients ingest the new Unique-ID and follow a logical sequence as assigned by the stamping server, without corrupting the client state.

In some examples, the CRDT approach is implemented as a Fluid Framework and service. In the Fluid Framework, each Fluid client is responsible for the state of the client. The Fluid Framework requires a Fluid service to sync data between clients. The role of the stamping server in the Fluid service is to order operations and broadcast the ordered operations to all clients within the framework. The stamping server determines the order of the operations based on originating timestamp of network communication to the stamping server. The stamping server is also responsible for saving operations to persistent data storage. The Fluid Framework is a collection of client libraries for building applications with distributed state. These libraries allow multiple clients to create and operate on shared, synchronized distributed data structures (DDSs) using coding patterns similar to those used to work with local data. The Fluid Framework manages connections to services and keeps all clients in sync so that developers can focus on the client experience. DDSs are the foundation of the Fluid Framework. They are designed such that the Fluid runtime is able to keep the DDSs in sync across clients while each client operates on the DDSs in largely the same way the clients would operate on local data. The data source for a Fluid solution can represent numerous DDSs. There are many types of DDSs including a SharedMap that is a distributed version of a JavaScript Map, and a SharedString that is designed to enable real-time editing of text data by multiple clients simultaneously. Developers can use the DDSs included with the Fluid Framework or develop new ones. Any practical limits on the types of data and size of a DDS will be specific to the implementation of that DDS. DDSs can contain text, images, and other binary data and can effectively be any size.

While previous systems keep a source of truth on the server, the Fluid service is responsible for taking in data operations, sequencing the operations, and returning the sequenced operations to the clients. Each client is able to use that sequence to independently and accurately produce the current state regardless of the order the client receives operations. As a typical flow, client code changes data locally and Fluid runtime sends that local change to the Fluid service. Fluid service sequences that received operation and broadcasts the sequenced operation to all clients. Fluid runtime incorporates the sequenced operation into local data and raises a "valueChanged" event. Client code handles that valueChanged event by updating view and running business logic.

For the Fluid Framework, the two classes of data storage are session storage and persistent storage. Session storage is managed by the Fluid service and is, essentially, a central record of all the operations (ops) performed on the DDSs. This record is used by the Fluid clients to produce identical local instances of the DDSs. Session storage also includes ops that summarize all past operations to improve performance for clients that join sessions later and for efficiencies when saving to persistent storage.

Persistent storage is a record of ops (and summary ops) saved outside of the Fluid service. This could be a database, blob storage, or a file. Using persistent storage allows a Fluid solution to persist across sessions. These files may share many of the properties of a normal file, such as permissions and a location in a file structure, but because these experiences rely on the Fluid service, downloading the files and working locally is not supported.

In order to keep all clients in sync, the clients must be connected to a Fluid service. The core responsibility of the Fluid service is sequencing all the incoming Fluid operations and then broadcasting them to all clients. Because the ops are ordered, and because each client is running the same code, the DDSs in each client eventually end up in an identical state. While there is not a centralized Fluid service for all Fluid experiences, each Fluid experience has only one Fluid service. Fluid clients connect to the Fluid service using the WebSocket protocol, in some examples. However, the Fluid runtime manages all of the connections so that Fluid client developers can focus on local experiences.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

FIG. 1 illustrates an example distributed computing system 100 that advantageously performs the modified CRDT solution. For clarity, a simplified architecture is depicted of first, second and third client devices 102a, 102b and 102c that are in communication via respective communication channels 104a, 104b and 104c and a network 106 with a stamping server 108 and a network storage device 110. Each client device 102a, 102b, and 102c receive a respective first, second, and third replica 114a, 114b, and 114c of data 114, such as a CRDT DDS for example, from the network storage device 110. Data 114 may be any type of CRDT DDS or array, such as a document, database, state, database software, text editing software, chat software, or any other suitable distributed data structure type. In response to receiving a first operation to the first replica 114a originating at the first client device 102a, the first client device 102a associates the first operation to a first Unique-ID that corresponds to a namespace context having potential for an unresolvable merge inconsistency. The first operation to the first replica 114a originating at the first client device 102a may be a user interaction or user-initiated operation intended to change data 114, for example.

A namespace context is a scenario or use-case where a possibility of conflict exists. The scenario can be uniquely identified with an identifier (ID). In one non-limiting example, an operation includes adding an image to a document. The image itself has an identifier, and the image insertion scenario can be uniquely identified with the image insertion activity type having a unique identifier as well. Thus, the scenario includes a context of an image insertion with a unique identifier that is associated with the image being inserted, or added, to the document. For images originating at the client, the client assigns a random identifier. For images received by the client, a previously assigned identifier to the image is used for the context of adding the image to the document.

A namespace context may refer to a specific operation within an application setting that has a probability to generate a conflict. For example, in a Microsoft Word document, there may be a fixed set of operations that result in a high likelihood of conflict, such as inserting an image, adding a comment, deleting text, and so forth. As another example, in a Microsoft Excel document, operations such as updating a field, resizing a field, highlighting a field, or any other modification to a cell may be included in the set of operations for that application that have a probability for conflict generation. As yet another example, two different users working on a loop component table, where one user inserts a column and the other user is deleting a row, can result in an asymmetric table and thus a conflict. Each of these individual operations (i.e., inserting an image, adding a comment, resizing a field, etc.) has its own Unique-ID. The Unique-ID is associated with the namespace, that is the context, in which an operation is being applied. In other words, a combination of the type of object (i.e., image, comment, text, field, cell, etc.) and the type of operation (i.e., resize, delete, insert, etc.) provides the namespace that is assigned the Unique-ID. When the same Unique-ID is identified in multiple namespace contexts, the operation is identified as a collision—that is, an operation that would result in a merge inconsistency if processed—and the operation is rejected before a merging operation can occur, and sent back to the client for update or modification.

In the example scenario provided in system 100, the first client device 102a communicates the first operation "Op1a" 116 with the first Unique-ID "1111" to the stamping server 108 to share, or replicate, the first operation with the other replicas of data 114 in the network. Stamping server 108 includes collision detector 109. Collision detector 109 is a thin code layer, or lightweight component, which identifies the first Unique-ID "1111" associated with the first operation "Op1a" 116. The stamping server 108 receives a second operation "Op2a" 118 and a third operation "Op2b" 120a to the second replica 114b from client device 102b. The second operation "Op2a" 118 is associated with a second Unique-ID "3333" and the third operation "Op2b" 120a is associated with the first Unique-ID "1111". Collision detector 109 of stamping server 108 detects a collision between operation "Op1a" 116 and operation "Op2b" 120a based on the two operations having the same Unique-ID of "1111", which indicates an actual instance of an unresolvable merge inconsistency. In response to collision detector 109 detecting the collision, the stamping server 108 rejects the second operation received later in time, which is operation "Op2b" 120a from client 102b, and sends the rejection to the originating client, client device 102b. Upon client device 102b receiving a rejection to the operation "Op2b" 120a from the stamping server 108, the second client device 102b modifies the operation "Op2b" to generate a fourth operation "Op2b" 120b with an associated Unique-ID "1112" that is different from the previous Unique-ID used for the same operation from client 102b, which resolves the potential for unresolvable merge inconsistency. The client device 102b modifies, or fixes, the operation by changing the Unique-ID for that namespace, such that when the stamping server receives the modified operation with the updated Unique-ID, and communicates it back to the other clients in the distributed network of system 100, the updated Unique-ID for that namespace is updated throughout the distributed system to all clients and subsequent operations in the same namespace can be identified and future collisions in that namespace detected. The originating second client that ultimately receives the rejection for the operation detected as a collision by the server receives the latest accepted server state, either before the rejection message is received or along with the rejection operation received.

The stamping server 108 merges the first operation "Op1a" 116 with one or more replicas, such as replica 114b and 114c at respective clients 102b and 102c, and merges modified operation "Op2b" with Unique-ID "1112" with one or more replicas (112a and 112c) at respective client systems or device (102a and 102c) if no further collisions are detected. The examples herein improve avoidance of low probability conflicts by sending Unique-IDs in the metadata of operations in multiple namespaces to detect potential inconsistencies before merging the operations, rejecting detected collisions and sending them back to the originating client device for modification and resubmission, avoiding disruptions to the distributed computing system and maintaining the client state with the guarantee of eventual consistency throughout the network.

As previously mentioned, the stamping server 108 is a lightweight server that has no information about the data purpose of received operations. The current states 111 of Unique-IDs in all namespaces is stored at the stamping server 108. The stamping server 108 uses the known current states for comparison with Unique-IDs sent with the new incoming operations from various clients. The stamping server 108 reads the incoming operation numbers and, if the stored Unique-ID for a particular namespace is from an older state, updates the stored state for that namespace with the new Unique-ID received and passes the new Unique-ID to the other client devices. Other client devices ingest the new Unique-ID since the number, or identifier, is unique and follows a logical sequence as assigned by the stamping server 108. Client devices 102a-102c include the Unique-IDs as a small amount of information sent with the operations to the server that enable the stamping server 108 to detect a possibility of a conflict, or a merge inconsistency, before attempting a merge by comparing the small amount of information, which is the Unique-IDs, to identify a collision. A collision, as used herein, is an identical match between two Unique-IDs.

Storage of the current Unique-ID states for namespaces at the stamping server may be persistent, in some examples, or may be temporal in other examples. The duration of the Unique-ID storage may be determined by the available time window for merging new changes, for example, to reduce overall storage content at the server. By maintaining the current state of Unique-IDs at the server, regardless of the duration, stability is provided to the distributed system for CRDT operations.

In an illustrative example, with continuing reference to FIG. 1, first and second client devices 102a and 102b are sending operations ("ops") while third client device 102c is listening to the ops. Initially, first client device 102a sends operation "Op1a" to stamping server 108. Shortly thereafter, the second client device 102b sends operation "Op2a" and operation "OP2b" to the stamping server 108. Operation "Op2b" from second client device 102b conflicts with operation "Op1a" from first client device 102a.

Each client 102a, 102b, and 103c is provisioned with information defining possible operation contexts of concern for inconsistencies along with corresponding Unique-IDs. In this example, first client device 102a determines that operation "Op1a" 116 is associated with identifier "1111". Second client device 102b determines that operation "Op2a" 118 is associated with identifier "3333" and operation "Op2b" 120a is associated with identifier "1111". The collision detector 109 of stamping server 108 detects the conflicting identifiers "1111" for the same operation sent from two different replicas and stamping server 108 sends a rejection 122 of operation "Op2b" 120a to the second client device 102b, since "Op2b" 120a is the later received operation by the stamping server 108. The second client device 102b receives rejection 122 of "Op2b" 120a, modifies, or fixes, the operation "Op2b" by updating the Unique-ID for "Op2b" to "1112" and resends operation "Op2b" 120b with Unique-ID "1112" to the stamping server 108. When stamping server 108 receives the re-transmitted operation "Op2b" 120b with the updated Unique-ID "1112", and absent any other detected collision, stamping server 108 accepts operation "Op2b" 120b and replicates the updated Unique-ID "1112" to the other client devices in system 100. Subsequent operations in the same namespace sent by other client devices in the system will then use the updated Unique-ID "1112" until a future modification is replicated throughout the system.

Because the client device has the knowledge of the purpose of the operation and data being sent, the client device also knows if this data and/or operation can interfere with any other client data and/or operation to generate a conflict. The unique identifier ("Unique-ID") concept abstracts the knowledge and the purpose of a unique operation within a particular context with a Unique-ID. As a result, the stamping server does not require knowledge or understanding of the purpose of the operations received. The stamping server 108 is provided a thin code layer, collision detector 109, that enables the stamping server to compare extra information received (e.g., Unique-IDs) to detect whether two operations are the same unique operation that may cause a merge inconsistency. The extra information associated with the operation can be kept as a unique identifier (e.g., integer, globally unique identifier (GUID) or 32-byte string ID) that is added as metadata to the operation, which can be used by the stamping server 108 to detect, or predict, the conflict or collision. The stamping server 108 receives the metadata provided with the operations and identifies the Unique-IDs to quickly predict whether or not there is a possibility of conflict or collision with the received operations. Collision detector 109 further configures the stamping server 108 to respond to the results of collision detection by rejecting the operation. In response to detecting a potential conflict, or collision, the stamping server 108 renumbers or re-stamps the rejected operation and sends the rejected operation back to the originating client. The rejection by the stamping server 108 enables modification of the conflicting operation whereby the originating client device resends or retransmits the modified operation so that other client devices may consume the operation in such a way that the replica maintains or eventually reaches consistency. The new Unique-ID corresponding to the modified operation allows for a recheck by the stamping server 108 before merging operations.

The Unique-ID concept of handling information at the stamping server 108 can be extended to multiple Unique-IDs for different possible component contexts. Unique-ID matching at the server may be implemented as a hard constraint to meet, applying to multiple contexts that may be modeled as namespace(s). When the constraint is not met at the stamping server 108, the stamping server 108 has anticipated conflict based on the match in the Unique-IDs. In response, the stamping server 108 rejects the operation and the client device is asked to send the operation again after fixing, or modifying, the operation appropriately. To fix or resolve the inconsistency, the client device can make any change to the operation. In an example, the client device 102b changes the Unique-ID to avoid the same conflict. In another example, the client device 102b can delete the object in the operation that is associated with the conflicting Unique-ID. In another example, the client device 102b can present a prompt via a user interface to receive a user input for an alternative operation that avoids an inconsistency or conflict with another operation by another client device (102a and 102c).

The multiple namespace mechanism allows a client device to send more than one Unique-ID in a single operation with the stamping server 108 being able to easily process the single operation. With the benefit of the unique-IDs, the present disclosure enables conflict avoidance, preventing disruptions to the system while imposing insignificant or marginal data throughput and computational overhead requirements.

Figure 2:
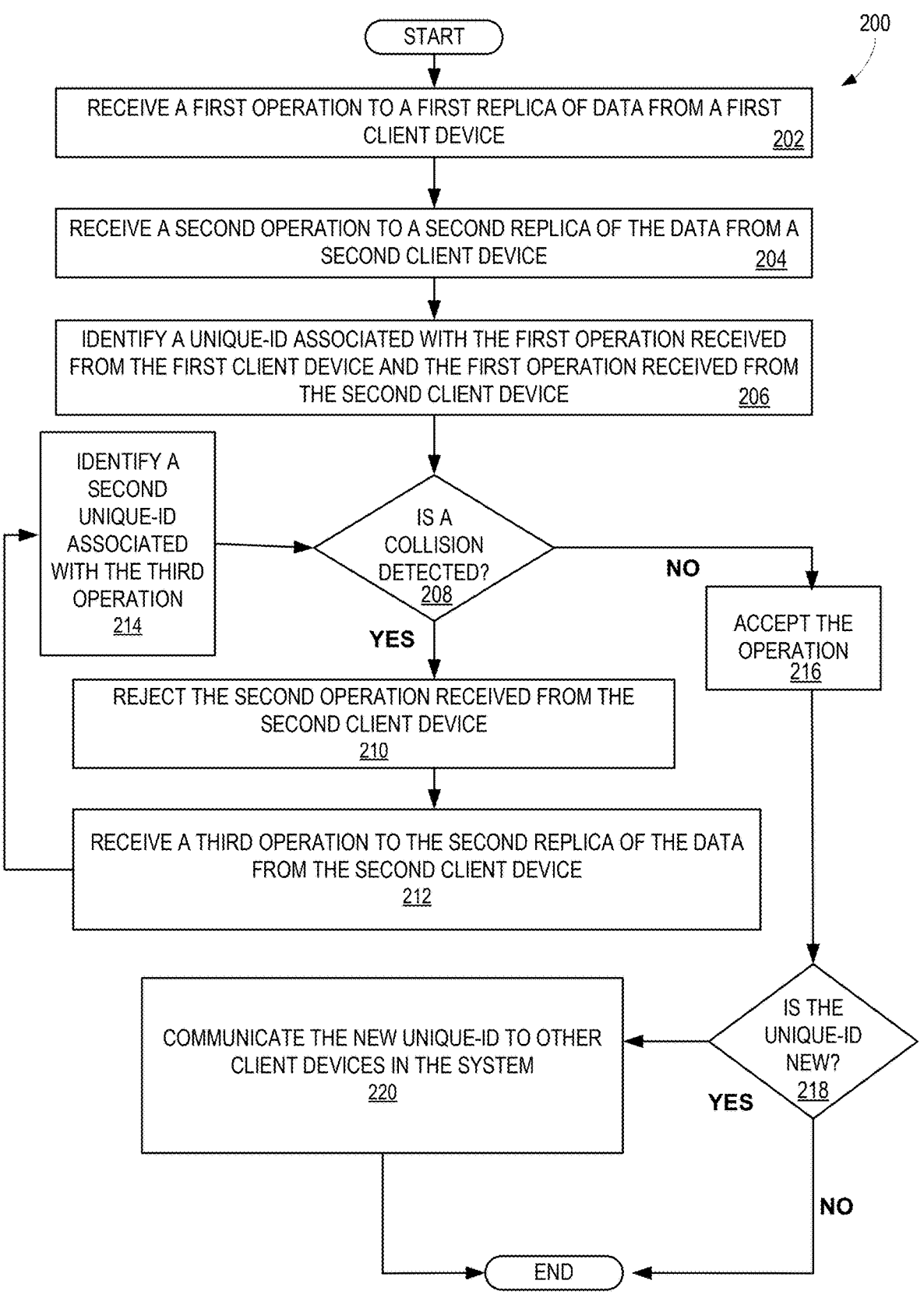
FIG. 2 illustrates an example flowchart of exemplary operations for conflict avoidance with operation-based CRDT that may be performed when using example architectures, such as the architecture of FIG. 1.

FIG. 2 depicts a flowchart 200 illustrating exemplary operations that may be performed by distributed computing system 100. In some examples, operations described for flowchart 200 are performed by computing device 600 of FIG. 6. A server receives a first operation to a first replica of data from a first client device at operation 202. The server may be a lightweight server of a distributed computing environment, such as stamping server 108 in FIG. 1, for example. The operation received may be any suitable operation to a CRDT DDS. The replica may be a replica of data obtained by the client device from a network storage device of the distributed computing system, and multiple other replicas of the same data may be obtained by other client devices within the same distributed computing system, in these examples. The server receives a second operation to a second replica of the data from a second client device at operation 204. In response to receiving the first operation to the first replica from the first client device and the second operation to the second replica from the second client device, the server identifies a Unique-ID associated with the first operation received from the first client device and the second operation received from the second client device at operation 206. The Unique-ID may be included as metadata, or other extra information associated with the operation transmitted to the server, for example.

The server determines whether a collision is detected at operation 206. In determining whether or not a collision is detected, the server compares the identified Unique-ID received with the operations to the replicas from the client devices, where the operations are for the same document in the same namespace context, to detect whether a merge operation would result in an unresolvable merge inconsistency for the other replicas of the document. The server may use a collision detector, such as collision detector 109 in FIG. 1, for example.

If a collision is detected by the server at operation 208, the second operation received from the second client device is rejected by the server at operation 210. The server rejects the second operation because the second operation was later in time than the first operation in this example. When the client device receives the rejection from the server, the client device may modify, or fix, the operation to re-send, or re-transmit, the operation to the server for the replica. In some examples, the client device may modify the operation to the replica at the local client device itself. In other examples, the client device may maintain the same operation to the replica at the local client device, and modify or update the Unique-ID associated with the operation that is resent to the server.

The server receives a third operation to the second replica of the data from the second client device at operation 212. The server identifies a second Unique-ID associated with the third operation received at operation 214. The second Unique-ID may be a modified identifier for the given namespace, for example. The server then returns to operation 208 to determine whether a collision is detected for the third, modified operation received with the updated identifier, and proceeds iteratively until an operation is accepted.

If a collision is not detected at operation 208, the first operation received from the first client device and the second operation received from the second client device (or the third operation received from the second client device in examples where the second operation was rejected at operation 210 and a third operation is received at operation 212) are accepted at operation 216. Upon accepting the operation(s), the server determines whether the Unique-ID identified with the received operations is new to the distributed system at operation 218. The server may compare the Unique-ID to stored current states at the server, for example. If the server determines that the Unique-ID identified is not new, the process terminates thereafter. If the server determines that the Unique-ID identified is new, the server communicates the new Unique-ID to other client devices in the distributed system at operation 212, with the process terminating thereafter. The server also updates the new Unique-ID at the stored current states on the server.

With reference now to FIG. 3, process 300 provides exemplary operations for conflict avoidance with operation-based CRDT in a distributed environment using architecture such as distributed computing system 100 in FIG. 1, for example. The process begins with a first client device identifying more than one namespace associated with the first replica at operation 302. Each namespace uniquely corresponds to one or more contextual features and each namespace can contain multiple Unique-IDs. The first client device may be any client device of a distributed computing system, or CRDT system, such as any of client devices 102a, 102b, and/or 102c in FIG. 1. The first client device receives an operation at the first replica at operation 304. The received operation may be a change to the first replica, for example, such as an image insertion, comment addition, text deletion, field resizing, or any other suitable change to data or a DDS. The first client device identifies its current component-ID for a specific namespace context associated with the received operation at the first replica at operation 304. A current component-ID of a given client device may be the current Unique-ID for a specific operation in a specific namespace context within the distributed system, for example. The current component-ID, or current state of Unique-IDs, for the distributed system may also be stored at the server, such as current states 111 in FIG. 1.

The client device associates the current component-ID with the received operation at operation 308. The current component-ID may be associated as metadata of the received operation in some examples, or as additional information associated with the received operation in other examples. As one illustrative example, the current component-ID may be a Unique-ID, such as Unique-ID "1111" of operation "Op1a" 116 or Unique-ID "3333 of operation "Op2a" 118 in FIG. 1. The client device transmits the received operation and associated component-ID to a server at operation 310. The server may be a CRDT server of a distributed computing system, such as stamping server 108 of distributed computing system 100 in FIG. 1, for example.

In response to transmitting the received operation and associated component-ID to the server at operation 310, the client device receives a rejection of the transmitted operation from the server at operation 312. The rejection is in response to the server detecting a collision, or potential for unresolvable merge inconsistency, with the transmitted operation from the first client device. In response to receiving the rejection from the server, the client device modifies the operation, including associating an updated component-ID with the modified operation at operation 314. The updated component-ID may be an incremented Unique-ID, in some examples, such as Unique-ID "1112" of operation "Ob2b" 120b in FIG. 1. Upon modification of the operation and associated ID, the client device transmits the modified operation and associated updated component-ID to the server at operation 316, with the process terminating thereafter if no further rejections are received from the server.

In an illustrative example, when the server receives the Unique-IDs from the client devices of the distributed system, the server compares them to stored current states for namespaces within the distributed environment to quickly infer whether or not there is a possibility of conflict or collision, so that the server can quickly reject the operation received second, or later in time than the initial operation with the same Unique-ID. The originating client device of the second, or later, operation that receives the rejection will have received the initial operation sent by the first client device from the server in the meantime, and can consume the initial operation with the current component-ID without inconsistency, while changing its own component-ID to associate with its modified operation—that is, the rejected operation now modified for resending—with the changed, or updated, component-ID. By having the server reject the detected collision prior to merge operations, and requiring the originating client device of the rejected operation to modify and resend the operation, with an updated component-ID, the system prevents unresolvable merge inconsistencies and associated disruptions to the CRDT system while maintaining the client state. The modified operation should be accepted by the server upon resending, absent any other detected collisions, and the updated component-ID shared with the other client devices of the system when the modified operation is distributed.

With reference now to FIG. 4, process 400 provides exemplary operations for conflict avoidance with operation-based CRDT in a distributed environment using architecture such as distributed computing system 100 in FIG. 1, for example. In an example scenario, a first client device and a second client device each receive a first operation at their respective local replicas of data, such as a CRDT DDS, and the first client device and the second client device both associate the current Unique-ID for the namespace context of the first operation with the respective received operations to transmit to the server. The transmission from the first client device is received by the server first, with the transmission of the second client device being received shortly after, and the server identifies that each transmitted operation is associated with the same Unique-ID. Upon detecting this collision, the server rejects the operation that was received second, or later in time, which is the operation transmitted from the second client device.

In this example scenario, upon receiving the rejection, the second client device modifies the first operation to generate a third operation that resolves the previously unresolvable merge inconsistency by accessing a new current version of the data, or CRDT DDS, stored on the network storage device at operation 402. The second client device associates a new Unique-ID with the generated third operation based on modifications to the current version of the data to resolve the merge inconsistency at operation 404. The second client device sends the third operation with the new Unique-ID to the server at operation 406, with the processing terminating thereafter.

With reference now to FIG. 5, an example flowchart is provided of exemplary operations for operation-based CRDT that may be performed when using example architectures, such as the architecture of FIG. 1. In keeping with the examples described herein, a client device modifies the first operation to generate a third operation that resolves the previously unresolvable merge inconsistency by receiving the second operation that is stamped by the stamping server at operation 502. The second operation is an intervening operation between the first operation and the third operation in these examples. The client device merges the second operation with the first replica to generate a modified first replica at operation 504. The client device then revises the first operation to generate the third operation based on the modified first replica at operation 506. The client device sends, or transmits, the third operation with an updated Unique-ID that corresponds to a change to the modified first replica at operation 508, with the process terminating thereafter.

While the aspects of the disclosure have been described in terms of various examples with their associated operations, a person skilled in the art would appreciate that a combination of operations from any number of different examples is also within scope of the aspects of the disclosure.

In some examples, a fluid relay service is utilized to provide updates to the various clients of a CRDT system, or distributed computing system, where there is a central lightweight fluid server that performs the lightweight task of numbering or re-numbering the operations sent by the clients and then broadcasting the operations to other clients within the system. In an example scenario where a server is connected to multiple clients, with each client running a fluid framework, a first client and a second client send operations that can conflict while other clients are listening for operations from the server. The server has no information about the data purpose of operations received from the clients in this context, and simply reads the incoming operation numbers. When the server identifies the Unique-IDs received with the incoming operations, the server compares the Unique-IDs to quickly infer whether there is a possibility of a conflict and rejects the operation that is later in time, with a request that the originating client device fix, or resend, the operation. By the time the originating client device receives the rejection of the initial operation, the originating client device will have also received the other client device operation that the server identified as first in time and accepted and distributed to the other clients, so that the originating client can consume received operation in such a way that the model is not inconsistent, that is its own component-ID could be changed or incremented so that when the originating client device modifies and resends its operation the resent operation will not conflict.

The Unique-ID concept of handling information at the server can be extended to multiple Unique-IDs for different component contexts, wherever there is a possibility of conflict. The Unique-ID matching or identification at the server is a hard constraint applied to individual namespaces, providing for multiple namespace processing of Unique-IDs in a single operation.

Example Operating Environment

Figure 6:
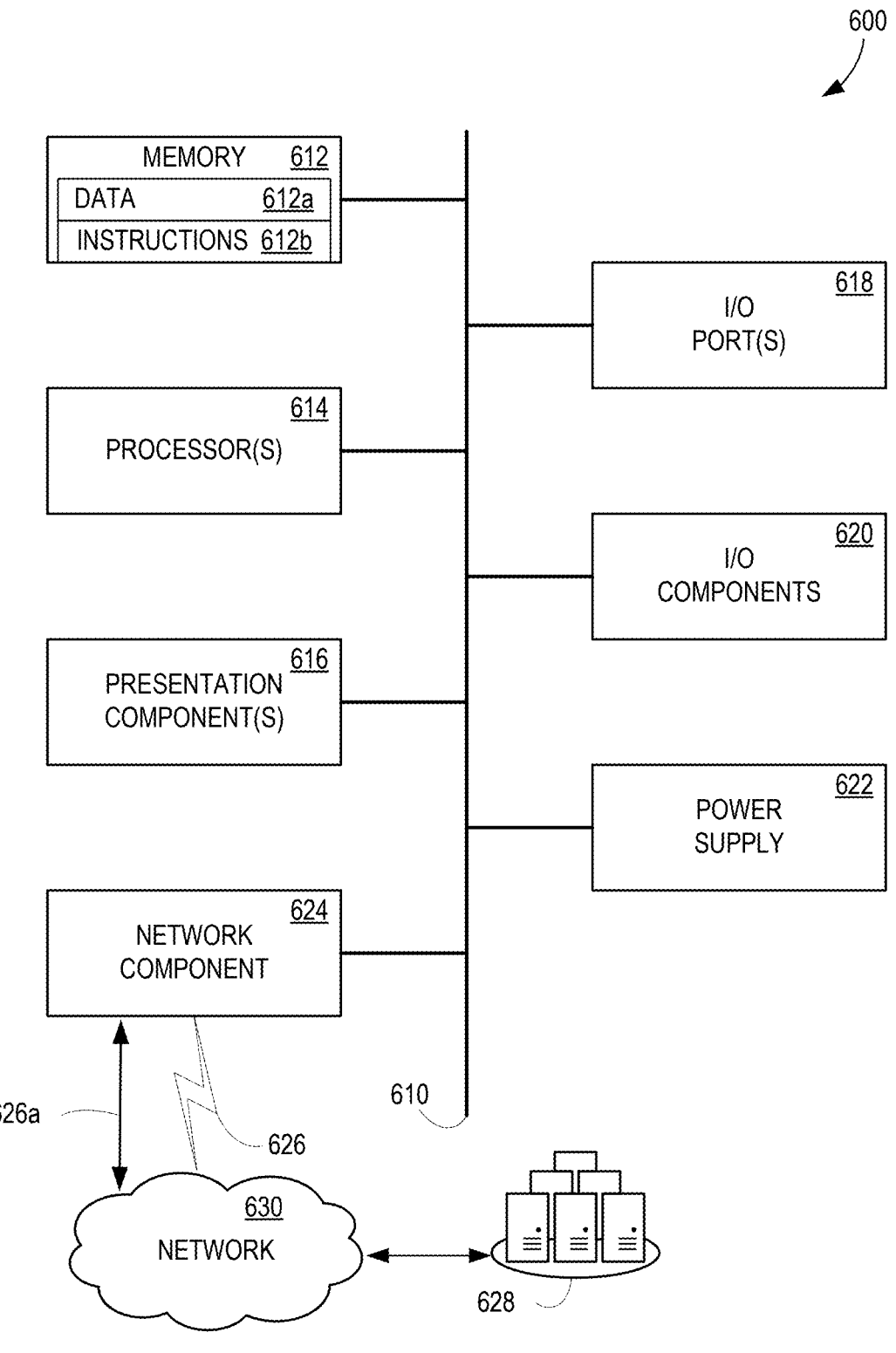
FIG. 6 shows a block diagram of an example computing device suitable for implementing some of the various examples disclosed herein.

FIG. 6 is a block diagram of an example computing device 600 (e.g., a computer storage device) for implementing aspects disclosed herein and is designated generally as computing device 600. In some examples, one or more computing devices 600 are provided for an on-premises computing solution. In some examples, one or more computing devices 600 are provided as a cloud computing solution. In some examples, a combination of on-premises and cloud computing solutions are used. Computing device 600 is but one example of a suitable computing environment and is not intended to suggest any limitation as to the scope of use or functionality of the examples disclosed herein, whether used singly or as part of a larger set.

Neither should computing device 600 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 600 includes a bus 610 that directly or indirectly couples the following devices: computer storage memory 612, one or more processors 614, one or more presentation components 616, input/output (I/O) ports 618, I/O components 620, a power supply 622, and a network component 624. While computing device 600 is depicted as a seemingly single device, multiple computing devices 600 may work together and share the depicted device resources. For example, memory 612 may be distributed across multiple devices, and processor(s) 614 may be housed with different devices.

Bus 610 represents what may be one or more buses (such as an address bus, data bus, or a combination thereof). Although the various blocks of FIG. 6 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 6 and the references herein to a "computing device." Memory 612 may take the form of the computer storage media referenced below and operatively provide storage of computer-readable instructions, data structures, program modules and other data for the computing device 600. In some examples, memory 612 stores one or more of an operating system, a universal application platform, or other program modules and program data. Memory 612 is thus able to store and access data 612a and instructions 612b that are executable by processor 614 and configured to carry out the various operations disclosed herein. Thus, computing device 600 comprises a computer storage device having computer-executable instructions 612b stored thereon.

In some examples, memory 612 includes computer storage media. Memory 612 may include any quantity of memory associated with or accessible by the computing device 600. Memory 612 may be internal to the computing device 600 (as shown in FIG. 6), external to the computing device 600 (not shown), or both (not shown). Additionally, or alternatively, memory 612 may be distributed across multiple computing devices 600, for example, in a virtualized environment in which instruction processing is carried out on multiple computing devices 600. For the purposes of this disclosure, "computer storage media," "computer storage memory," "memory," and "memory devices" are synonymous terms for memory 612, and none of these terms include carrier waves or propagating signaling.

Processor(s) 614 may include any quantity of processing units that read data from various entities, such as memory 612 or I/O components 620. Specifically, processor(s) 614 are programmed to execute computer-executable instructions for implementing aspects of the disclosure. The instructions may be performed by the processor, by multiple processors within the computing device 600, or by a processor external to the client computing device 600. In some examples, the processor(s) 614 are programmed to execute instructions such as those illustrated in the flow charts discussed below and depicted in the accompanying drawings. Moreover, in some examples, the processor(s) 614 represents an implementation of analog techniques to perform the operations described herein. For example, the operations may be performed by an analog client computing device 600 and/or a digital client computing device 600. Presentation component(s) 616 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 600, across a wired connection, or in other ways. I/O ports 618 allow computing device 600 to be logically coupled to other devices including I/O components 620, some of which may be built in. Example I/O components 620 include, for example but without limitation, a microphone, joystick, game pad, satellite dish, scanner, printer, wireless device, etc.

Computing device 600 may operate in a networked environment via the network component 624 using logical connections to one or more remote computers. In some examples, the network component 624 includes a network interface card and/or computer-executable instructions (e.g., a driver) for operating the network interface card. Communication between the computing device 600 and other devices may occur using any protocol or mechanism over any wired or wireless connection. In some examples, network component 624 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 624 communicates over wireless communication link 626 and/or a wired communication link 626a to a remote resource 628 (e.g., a cloud resource) across network 630. Various different examples of communication links 626 and 626a include a wireless connection, a wired connection, and/or a dedicated link, and in some examples, at least a portion is routed through the internet.

Although described in connection with an example computing device 600, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:
1. A system comprising:
a processor; and
a computer-readable medium storing instructions that are operative upon execution by the processor to:
receive, from a first client device of a distributed computing environment, a first operation to a first replica of a Conflict-Free Replicable Data Type (CRDT) data structure corresponding to a document;
receive, from a second client device of the distributed computing environment, a second operation to a second replica of the CRDT data structure;
in response to receiving the first operation and the second operation, identify a Unique-ID associated with the first operation and the second operation;
determine whether a collision is detected based on the Unique-ID identified;
in response to a determination that the collision is detected, reject the second operation received from the second client device; and
receive, from the second client device, a third operation to the second replica of the CRDT data structure, wherein receiving the third operation further comprises:
sending, to the second client device, the first operation that is stamped by a stamping server;
causing the second client device to merge the first operation with the second replica to generate a modified second replica;
causing the second client device to revise the second operation to generate the third operation based on the modified second replica; and
causing the second client device to communicate the third operation with an updated Unique-ID, the updated Unique-ID corresponding to a change to the modified second replica.
2. The system of claim 1, wherein the instructions are further operative to:
in response to receiving the third operation, identify a second Unique-ID associated with the third operation; and
determine whether a collision is detected.
3. The system of claim 1, wherein the instructions are further operative to:
in response to a determination that the collision is not detected, accept the first operation and the second operation.
4. The system of claim 3, wherein the instructions are further operative to:
determine whether the Unique-ID associated with the first operation is updated from a current state; and communicate the updated Unique-ID to other client devices in the distributed computing environment.

5. The system of claim 1, wherein the second operation is modified by the second client device to generate the third operation.

6. The system of claim 1, wherein the first replica and the second replica are obtained from CRDT data structures stored on a network storage device of the distributed computing environment.

7. The system of claim 1, wherein the Unique-ID associated with the first operation and the second operation are identified in metadata communicated with the first operation and the second operation.

8. A computer-implemented method comprising:

receiving, at a stamping server, a first operation to a first replica of a Conflict-Free Replicable Data Type (CRDT) data structure corresponding to a document from a first client device;

receiving, at the stamping server, a second operation to a second replica of the CRDT data structure from a second client device;

identifying a Unique-ID associated with the first operation and the second operation;

detecting a collision based on the Unique-ID identified;

rejecting the second operation received from the second client device; and receiving a third operation to the second replica of the CRDT data structure from the second client device, the third operation including an updated Unique-ID, wherein receiving the third operation further comprises:

sending, to the second client device, the first operation that is stamped by the stamping server;

causing the second client device to merge the first operation with the second replica to generate a modified second replica;

causing the second client device to revise the second operation to generate the third operation based on the modified second replica; and causing the second client device to communicate the third operation with the updated Unique-ID based on associating the revised second operation to the updated Unique-ID that corresponds to a change to the modified second replica.

9. The computer-implemented method of claim 8, further comprising:

responsive to receiving the third operation, identifying the updated Unique-ID; and accepting the third operation based on the updated Unique-ID avoiding collision with the Unique-ID associated with the first operation received.

10. The computer-implemented method of claim 8, further comprising:

accessing a new current version of the CRDT data structure stored on a network storage device; and generating the third operation based on changes to the new current version of the CRDT data structure to resolve potential inconsistency.

11. The computer-implemented method of claim 8, wherein the first replica and the second replica are obtained from CRDT data structures stored on a network storage device of a distributed computing environment.

12. The computer-implemented method of claim 8, further comprising:

including the Unique-ID in metadata of the first operation.

13. A computer storage device having computer-executable instructions stored thereon, which, on execution by a computer, cause the computer to perform operations comprising:

receiving, at a stamping server, a first operation to a first replica of a Conflict-Free Replicable Data Type (CRDT) data structure corresponding to a document from a first client device;

receiving, at the stamping server, a second operation to a second replica of the CRDT data structure from a second client device;

identifying a Unique-ID associated with the first operation and the second operation;

detecting a collision based on the Unique-ID identified;

rejecting the second operation received from the second client device; and receiving a third operation to the second replica of the CRDT data structure from the second client device, the third operation including an updated Unique-ID, wherein receiving the third operation further comprises:

sending, to the second client device, the first operation that is stamped by the stamping server;

causing the second client device to merge the first operation with the second replica to generate a modified second replica;

causing the second client device to revise the second operation to generate the third operation based on the modified second replica; and causing the second client device to communicate the third operation with the updated Unique-ID based on associating the revised second operation to the updated Unique-ID that corresponds to a change to the modified second replica.

14. The computer storage device of claim 13, wherein the operations further comprise:

responsive to receiving the third operation, identifying the updated Unique-ID; and accepting the third operation based on the updated Unique-ID avoiding collision with the Unique-ID associated with the first operation received.

15. The computer storage device of claim 13, wherein the operations further comprise:

accessing a new current version of the CRDT data structure stored on a network storage device; and generating the third operation based on changes to the new current version of the CRDT data structure to resolve potential inconsistency.

16. The computer storage device of claim 13, wherein the first replica and the second replica are obtained from CRDT data structures stored on a network storage device of a distributed computing environment.

17. The computer storage device of claim 13, wherein the operations further comprise:

including the Unique-ID in metadata of the first operation.

18. The computer storage device of claim 13, wherein the second client device receives the second operation at the second replica, identifies a component-ID at the second client device for a specific namespace associated with the second operation received at the second replica, associates the component-ID of the second client device for the specific namespace with the second operation as the Unique-ID, transmits the second operation with the Unique-ID to the stamping server, receives a rejection of the second operation from the stamping server, modifies the second operation to generate the third operation, including updating the component-ID, and transmits the third operation with the updated component-ID as the updated Unique-ID to the stamping server.

* * * * *